United States Patent Office 3,375,284
Patented Mar. 26, 1968

3,375,284
PROCESS FOR PURIFYING AND DECOLORIZING ALKYLPHENOL-ETHYLENE OXIDE ADDUCTS
Harry T. Zika, South Charleston, and Louis F. Theiling, Jr., Charleston, W. Va., assignors to Union Carbide Corporation, a corporation of New York
No Drawing. Continuation-in-part of application Ser. No. 104,848, Apr. 24, 1961. This application Aug. 9, 1967, Ser. No. 659,306
1 Claim. (Cl. 260—613)

ABSTRACT OF THE DISCLOSURE

There is disclosed a process for purifying and decolorizing alkylphenol-ethylene oxide adducts which comprises contacting said adducts with an alkali metal borohydride.

Specification

This application is a continuation-in-part of Ser. No. 104,848, filed Apr. 24, 1961 and now abandoned.

The invention relates to a process for purifying and decolorizing alkylphenol-ethylene oxide adducts, to the purified and decolorized alkylphenol-ethylene oxide adducts produced by the process of the invention, and to the ammonium sulfate surfactants prepared from said purified and decolorized alkylphenol-ethylene oxide adducts.

Certain alkylphenol-ethylene oxide adducts which have hydrophobic character can be converted into useful surfactant compositions by reacting said adducts with sulfamic acid. The resultant surfactants are the ammonium sulfate salts of the starting alkylphenol-ethylene oxide adducts, and are widely used in household liquid detergent formulations. In such applications, the color of the detergent is an important commercial factor, which therefore makes it important to employ a surfactant having as close to a water-white color as possible. It is found, however, that in reacting sulfamic acid with an alkylphenol-ethylene oxide adduct, a high color intensity frequently develops in the surfactant product. As a result, the surfactant must be decolorized before it can be employed in a household liquid detergent formulation. The high color intensity is thought to be caused by reaction of the sulfamic acid with impurities which are present in the alkylphenol-ethylene oxide adduct, but which do not necessarily have too much of a deleterious effect on color until after the adduct has been reacted with sulfamic acid. Heretofore the color problem has been attacked by bleaching both the adduct and the surfactant resulting therefrom. However, no decolorizing agent was known which could be used to bleach the adduct such that satisfactory color was maintained through further processing with sulfamic acid.

The present invention is based upon the discovery that the hydrophobic alkylphenol-ethylene oxide adducts can be purified and decolorized by treatment with certain boron-containing compounds, and that the adducts which have been treated with these boron-containing compounds maintain satisfactory color through further processing with sulfamic acid. Thus, the ammonium sulfate surfactants produced from the purified and decolorized alkylphenol-ethylene oxide adducts of the invention can be employed in household liquid detergent formulations without the need for additional decolorizing treatment.

The process of the invention is a treatment of a hydrophobic alkylphenol-ethylene oxide adduct with an alkali metal borohydride which comprises contacting a hydrophobic alkylphenol-ethylene oxide adduct with a minor amount of an alkali metal borohydride for a period of time sufficient to impart to said alkylphenol-ethylene oxide adduct a color intensity of less than about 80 platinum-cobalt, as measured by test procedure ASTM D–1209–54.

The alkylphenol-ethylene oxide adducts which are employed in the invention are the hydrophobic alkylphenol-ethylene oxide adducts which can be represented by Formula I I 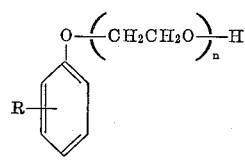

wherein R is a linear or branched chain alkyl radical having from about eight to about twenty, preferably from about nine to about fifteen, and most preferably about twelve carbon atoms, and $n$ is a number having an average value in the range of from about four to about fifteen, preferably from five to about nine, and most preferably about six. The above-described adducts are polyethers which have an alkyl-substituted phenyl radical bonded to a polyoxyethylene chain which is in turn terminated with a hydrokyl radical. The alkyl radical substituent can be in the ortho, meta, or para position of the phenyl radical, and consequently the adduct normally is a mixture having all three position isomers with the alkyl substituents on the ortho and parapositions predominating. Similarly, the adduct employed will normally be a mixture of molecules which have polyoxyethylene chains of varying lengths, with the average length being within the ranges stated hereinabove.

The alkylphenol-ethylene oxide adducts employed are those which are hydrophobic in character, that is, those which are suitable for use as the hydrophobic moiety of a surfacant. This hydrophobic character is obtained when the polyoxyethylene chain portion of the adduct constitutes from about 30 to about 60 weight percent, and preferably from about 40 to about 50 weight percent of the alkylphenol-ethylene oxide adduct.

The preparation of the alkylphenol-ethylene oxide adducts can be by known methods, for example, by condensing an alkylphenol with ethylene oxide. Exemplary alkylphenol-ethylene oxide adducts include the reaction products of ethylene oxide and the octylphenols, nonylphenols, decylphenols, tridecylpehnols, tetradecylphenols, pentadecylphenols, octadecylphenols, eicosylphenols, and the like.

The boron-containing compounds which have been found to be particularly useful in the process of the invention are the alkali metal borohydrides. Sodium borohydride is preferred, although lithium borohydride, potassium borohydride, cesium borohydride, and rubidium borohydride can also be employed. In addition, ammonium borohydride and the amine boranes can be employed.

A minor amount of the alkali metal borohydride is employed in the process of the invention. For example, from about 75 to about 1000 parts per million of alkali metal borohydride, based on weight of alkylphenol-ethylene oxide adduct, is a suitable amount. The preferred amount is from about 100 to about 400 parts per million of alkali metal borohydride, based on weight of alkylphenol-ethylene oxide adduct. It is preferred to employ the alkali metal borohydride in the solid crystalline form, although solutions in a suitable solvent can be employed if desired. Examples of such solvents include the lower aliphatic alcohols such as methanol and ethanol, and water. A convenient way to employ the alkali metal borohydride is in an aqueous solution stabilized with a small amount of alkali such as sodium hydroxide.

Prior to admixing the alkylphenol-ethylene oxide adduct and the alkali metal borohydride, the pH of said adduct is preferably at least 7.0. If necessary, the pH of the adduct can be adjusted by addition of a suitable alkaline material, for example an alkali metal hydroxide, bicarbonate, or carbonate.

The process of the invention can be carried out over a wide temperature range, for example, from about 20° C., and lower, up to about 150° C., and higher. The preferred temperature range is from about 70° C. to about 90° C.

The treatment is continued for a period of time sufficient to impart to the alkylphenol-ethylene oxide adduct a color intensity of less than about 80 platinum-cobalt, as measured by test procedure ASTM D–1209–54. The exact reaction time employed is dependent, in part, upon factors such as temperature and concentration of alkali metal borohydride, and therefore can vary over a wide range, for example, from a few minutes up to several hours. Ordinarily, the treatment will take from about one-half hour to about five hours, and preferably from about one to about two hours.

Upon completion of the process of the invention, it is desirable to adjust the pH of the product to a value of from 7.0 to about 8.5 by addition of acid, preferably phosphoric acid or other mineral acid such as sulfuric acid, hydrochloric acid, and the like. The pH adjustment of the product is desirable because the alkaline nature of the alkali metal borohydride can cause the product to be excessively basic, which is undesirable when reacting the alkylphenol-ethylene oxide adduct product with sulfamic acid. This acid is an expensive reagent, and increased amounts would be required for the reaction.

In a preferred embodiment of the process of the invention, the alkylphenol-ethylene oxide adduct is charged to a suitable reaction vessel equipped with agitator and conventional heat transfer means. If desired, an inert organic vehicle can be employed as a solvent and a diluent, although such use is not necessary. Exemplary organic vehicles which can be employed include hydrocarbons such as toluene, xylene, cyclohexane, heptane, and the like, ethers such as diisopropyl ether, the dimethyl ether of ethylene glycol, and the like. If the pH of the adduct is lower than 7.0, a base is added to increase the pH to at least 7.0. Alkali metal hydroxide, bicarbonate, or carbonate is suitable for this purpose. After adjusting the pH, a minor amount of crystalline alkali metal borohydride is added to the reaction vessel which then dissolves in the reaction mixture, and the contents are heated with agitation to a temperature in the range of from 70° C. to 90° C. for from one to two hours. It is preferred to blanket the contents of the reaction vessel with an atmosphere of an inert gas for the duration of the treatment with alkali metal borohydride. Nitrogen, helium, hydrocarbon gases, and the like are suitable inert gases which can be employed. At the end of the process time, the contents of the reaction vessel are cooled to about room temperature, and the pH of the product is adjusted to 7.0–8.5 by addition of phosphoric acid. The treated alkylphenol-ethylene oxide adduct can then be subjected to additional processing, such as sulfation with sulfamic acid, with out additional purification.

As one of its aspects, the invention provides a purified and decolorized alkylphenol-ethylene oxide adduct which has been treated with alkali metal borohydride according to the process of the invention. This purified alkylphenol-ethylene oxide adduct has wide utility in the preparation of surfactants for use in detergents, particularly liquid household detergents where low color is important for enhancing the commercial value of the product.

The alkylphenol-ethylene oxide adducts of the invention are characterized by a particularly low color intensity. The color intensity can be defined by comparison with platinum-cobalt (Pt-Co) standards according to the test procedure described ATSM D–1209–54. The alkali metal borohydride-treated alkylphenol-ethylene oxide adducts of the invention have a platinum-cobalt color intensity of less than about 80.

Briefly, the test procedure described in ASTM D–1209–54 is a visual comparison between the liquid to be tested and various concentrations of a stock solution containing cobalt chloride, potassium chloroplatinate, and hydrochloric acid. The stock solution is prepared by dissolving 1.245 grams of $K_2PtCl_6$, 1.000 grams of $CoCl_2.6H_2O$, and 100 milliliters of HCl (sp. Gr.—1.18) in distilled water, and diluting to one liter. Color standards are prepared by diluting the required volumes of stock solution to 100 milliliters with distilled water, according to the schedule shown in the table below:

| Color standard, No.: | Stock solution, ml. |
| --- | --- |
| 5 | 1 |
| 10 | 2 |
| 15 | 3 |
| 20 | 4 |
| 25 | 5 |
| 30 | 6 |
| 35 | 7 |
| 40 | 8 |
| 50 | 10 |
| 60 | 12 |
| 70 | 14 |
| 100 | 20 |
| 500 | 100 |

In another aspect, the invention provides a surfactant that is characterized by a low color absorbance which comprises the ammonium sulfate salts of the purified and decolorized alkylphenol-ethylene oxide adducts of the invention. The surfactants of the invention are represented by Formula II

II

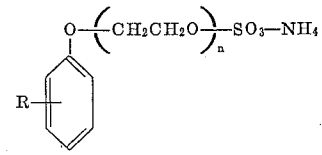

wherein the variable R and $n$ are as described above with respect to Formula I. These surfactants are prepared by reacting sulfamic acid with the purified and decolorized alkylphenol-ethylene oxide adducts of the invention.

The surfactants provided by the invention are characterized by low color absorbance, as measured on an AC Model Fisher Electrophotometer, or an equivalent instrument, equipped with a 525 B filter. The surfactants of the invention have a color absorbance of less than about 0.4 absorbance unit, measured by the above-identified instrument, or its equivalent, equipped with a 525 B filter.

Unless otherwise indicated, the alkylphenol-ethylene oxide adduct employed in the examples which follow was the reaction product of dodecylphenol and ethylene oxide, wherein the polyoxyethylene chain had an average length of about six oxyethylene units. The dodecylphenol employed was the product of the Friedel-Crafts addition of tetrapropylene to phenol, and contained some other alkyl-substituted phenols ranging from nonylphenol to pentadecylphenol, although it was predominantly (65–85 weight percent) the dodecylphenol.

*Example I*

The alkylphenol-ethylene oxide employed in this experiment had a pH of 6.6, an average molecular weight of 511 as determined by analysis for hydroxyl content, a color of 85 Pt-Co as determined by ASTM D-1209-54, and the color absorbance at 525 millimicrons of the ammonium sulfate surfactant derived from said adduct was greater than 1.0. The above-described adduct was charged to a one-liter fluted glass kettle equipped with stirrer, thermowell, and inlet and outlet for a nitrogen purge. To this charge, which weighed 324 grams, was added 0.084 gram of 98 percent crystalline sodium borohydride (259 parts per million). The reaction mixture was heated with vigorous agitation under a nitrogen purge at 75±5° C. for 1.5 hours. The pH of the reaction mixture was found to be 8.9. After cooling, the Pt-Co color of the treated adduct was found to be 50, and the absorbance at 525 millimicrons of the ammonium sulfate surfactant derived from the treated adduct was 0.195.

The preparation of the ammonium sulfate surfactant derived from the dodecylphenol-ethylene oxide adduct is illustrated by an experiment described in Example X, below.

*Example II*

By a procedure analogous to that described in Example I, 18,000 grams of the ethylene oxide adduct of dodecylphenol which had an average polyoxyethylene chain length of six oxyethylene units, and which had a pH of 6.6, was treated with 4.55 (253 parts per million) grams of 98 percent crystalline sodium borohydride. The treatment was accomplished at 75±5° C. for 1.5 hours, after which the pH of the product was adjusted to 7.0 by addition of 6 cubic centimeters of 85 percent phosphoric acid. The color absorbance at 525 millimicrons of the ammonium sulfate surfactant derived from the adduct was reduced from greater than 1.0 to 0.298 absorbance unit by the treatment.

*Example III*

By a procedure analogous to that described in Example I, 450 grams of the ethylene oxide adduct of dodecylphenol which had an average polyoxyethylene chain length of six oxyethylene units, was treated with 0.09 gram (200 parts per million) of 98 percent crystalline sodium borohydride for two hours at 80–85° C. The product color was reduced from 90 to 80 Pt-Co as measured by ASTM D-1209-54, and the color absorbance of ammonium sulfate surfactant derived from the adduct was reduced from 0.820 to 0.295 absorbance unit, as measured at 525 millimicrons.

*Example IV*

By a procedure analogous to that described in Example I, a portion of the ethylene oxide adduct of dodecylphenol having an average polyoxyethylene chain length of six oxyethylene units, was treated with 150 parts per million of 98 percent crystalline sodium borohydride for 1.5 hours at 80±5° C. The color absorbance of the ammonium sulfate surfactant derived from the above-described adduct was reduced from 0.650 to 0.388 absorbance unit, as measured at 525 millimicrons.

*Example V*

By a procedure analogous to that described in Example I, 450 grams of the ethylene oxide adduct of dodecylphenol having an average polyoxyethylene chain length of six oxyethylene units, was treated with 0.09 gram of 98 percent crystalline sodium borohydride for two hours at 80–85° C. The treatment reduced the color of the adduct from 90 to 80 Pt-Co, as measured by test procedure ASTM D-1209-54, and the color absorbance of the ammonium sulfate surfactant derived from the above-described adduct was reduced from 0.82 to 0.29 absorbance unit, as measured at 525 millimicrons.

*Example VI*

The ethylene oxide adduct of nonylphenol having an average polyoxyethylene chain length of four oxyethylene units, was treated with 300 parts per million of 98 percent crystalline sodium borohydride for 1.5 hours at 80° C. by a procedure analogous to that described in Example I. The color absorbance of the ammonium sulfate surfactant derived from the above-described adduct was reduced from 0.600 to 0.130 absorbance unit by this treatment.

*Example VII*

By a procedure analogous to that described in Example I, 450 grams of the ethylene oxide adduct of dodecylphenol having an average polyoxyethylene chain length of six oxyethylene units, was treated with 200 parts per million of crystalline potassium borohydride for two hours at 80–85° C. The color absorbance of the ammonium sulfate surfactant derived from the above-described adduct was reduced from 0.820 to 0.600 absorbance unit, as measured at 525 millimicrons.

*Example VIII*

By a procedure analogous to that described in Example I, the ethylene oxide adduct of dodecylphenol which had an average polyoxyethylene chain length of six oxyethylene units, was treated with 115 parts per million of sodium borohydride for two hours at 75° C. The sodium borohydride was employed in the form of an aqueous solution containing 11.90 weight percent sodium borohydride and 40.1 weight percent sodium hydroxide. After the treatment, the pH of the purified adduct was lowered to 7.0 by addition of 85 percent phosphoric acid. The color absorbance of the ammonium sulfate surfactant derived from the above-described adduct was reduced by the treatment from 0.190 to 0.075 absorbance unit, as measured at 525 millimicrons.

*Example IX*

By a procedure analogous to that described in Example I, the ethylene oxide adduct of dodecylphenol which had an average polyoxyethylene chain length of six oxyethylene units, was treated with 200 parts per million of 98 percent crystalline sodium borohydride at 25° C. for two hours. The color absorbance of the ammonium sulfate surfactant derived from the above-described adduct was reduced by the treatment from 0.820 to 0.485 absorbance unit, as measured at 525 millimicrons.

*Example X*

This experiment illustrates the preparation of the ammonium sulfate surfactant derived from an alkylphenol-ethylene oxide adduct such as those employed in the previous examples.

One gram-mole (511 grams, based on weight per hydroxyl equivalent) of the ethylene oxide adduct of dodecylphenol which had an average polyoxyethylene chain length of six oxyethylene units, is charged to a 1-liter round-bottomed fluted flask equipped with agitator, thermowell, induction line for a nitrogen purge, and a vent line. The adduct is heated to 50° C. under a high-purity nitrogen atmosphere, after which 1.03 moles of finely pulverized reagent grade sulfamic acid are fed slowly to the flask. After 5–10 minutes of purging, the temperature of the reaction mixture is increased to 100° C. The reactants are heated for one hour at 100° C., three hours at 120° C., and one hour at 130° C., with continuous nitrogen purge. The product is then cooled to about 80° C. and diluted with 96 grams of absolute ethanol and 177 grams of distilled water. The excess sulfamic acid is then neutralized with monoethanolamine or ammonium hydroxide until the pH of the reaction mixture is about 7.0. The product is the ammonium salt of the sulfated ethylene oxide adduct of dodecylphenol.

What is claimed is:

1. A process for purifying and decolorizing the hydrophobic alkylphenol-ethylene oxide adducts which are represented by the formula

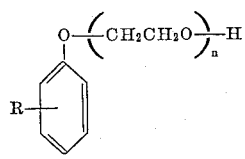

wherein R represents a dodecyl radical and $n$ represents a number having an average value of about six, which comprises contacting said alkylphenol-ethylene oxide adduct with a minor amount of sodium borohydride for a period of time sufficient to impart to said alkylphenol-ethylene oxide adduct a color intensity of less than about 80 platinum-cobalt, as measured by test procedure ASTM D–1209–54.

References Cited

UNITED STATES PATENTS 3,168,569   2/1965   Matell _____ 260—613

BERNARD HELFIN, *Primary Examiner.*